(12) United States Patent
Farhan et al.

(10) Patent No.: US 9,760,430 B2
(45) Date of Patent: Sep. 12, 2017

(54) SYSTEM AND METHOD FOR DRAM-LESS SSD DATA PROTECTION DURING A POWER FAILURE EVENT

(71) Applicant: Dell Products L.P., Round Rock, TX (US)

(72) Inventors: Munif Mohammed Farhan, Round Rock, TX (US); Lawrence Edward Knepper, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 90 days.

(21) Appl. No.: 14/839,250

(22) Filed: Aug. 28, 2015

(65) Prior Publication Data

US 2017/0060668 A1    Mar. 2, 2017

(51) Int. Cl.
*G06F 11/00* (2006.01)
*G06F 11/07* (2006.01)
*G06F 12/0804* (2016.01)
*G06F 1/30* (2006.01)
*G06F 11/30* (2006.01)

(52) U.S. Cl.
CPC .......... *G06F 11/0793* (2013.01); *G06F 1/30* (2013.01); *G06F 11/073* (2013.01); *G06F 11/0751* (2013.01); *G06F 11/3058* (2013.01); *G06F 12/0804* (2013.01); *G06F 11/079* (2013.01); *G06F 2212/1032* (2013.01); *G06F 2212/22* (2013.01)

(58) Field of Classification Search
CPC ..... G06F 11/3058; G06F 11/0751; G06F 1/30
See application file for complete search history.

(56) References Cited

U.S. PATENT DOCUMENTS

| | | | |
|---|---|---|---|
| 5,448,719 A * | 9/1995 | Schultz ................. | G11C 29/88 711/141 |
| 9,432,298 B1 * | 8/2016 | Smith ................. | H04L 49/9057 |
| 2009/0303630 A1 * | 12/2009 | Zhou ...................... | G06F 1/263 360/55 |
| 2016/0188414 A1 * | 6/2016 | Jayakumar ............... | G06F 1/30 711/103 |
| 2016/0283336 A1 * | 9/2016 | Petersen ............ | G06F 11/2015 |

* cited by examiner

*Primary Examiner* — Charles Ehne
(74) *Attorney, Agent, or Firm* — Baker Botts L.L.P.

(57) ABSTRACT

A solid-state drive (SSD) may not include a dynamic random access memory (DRAM) but rather may utilize a host memory buffer of system random access memory (RAM). During a power failure data on dirty cache lines may be lost. A power protection caching policy may be implemented where an SSD controller is capable of accepting a flush cache signal, which may be a signal to a redefined pin of the SSD or a command, from a controller of the information handling system. The controller may utilize a slope detect mechanism and/or a power good detect mechanism to detect a power failure and if a power failure is detected to issue a flush cache signal the SSD controller to cause a flush of all dirty cache lines from the host memory buffer before the power failure results in inoperability of circuitry associated with the dirty cache lines.

20 Claims, 4 Drawing Sheets

SYSTEM AND METHOD FOR DRAM-LESS SSD DATA PROTECTION DURING A POWER FAILURE EVENT

TECHNICAL FIELD

This disclosure relates generally to information handling systems and, more particularly, to providing a power protection caching policy to prevent data loss during a power failure event for a solid-state drive (SSD) that does not include dynamic random access memory (DRAM).

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more information handling systems, data storage systems, and networking systems.

The emerging trend for solid-state drives (SSD) is to remove (or rather, fabricate without) the internal dynamic random access memory (DRAM). Fabricating an SSD without DRAM saves at least time in manufacturing, reduces costs, reduces power consumption, reduces thermals, and reduces foot print. These DRAM-less SSDs leverage the system memory, including system DRAM, of the information handling system as temporary data buffers. However, such leveraging increases the risk of data loss, and sometimes significantly in the case of power interruption. Any of the data that resided in the system memory that was not flushed to the SSD will be lost when a power interruption occurs. The present invention addresses the issue of data loss that occurs during power interruption for DRAM-less SSDs.

SUMMARY

When power to a dynamic random access memory (DRAM) solid-state drive (SSD) or other information handling system component, such as a host system on chip (SOC), a system DRAM, or other component known to one of ordinary skill in the art, fails, dirty cache lines may need to be flushed back to the flash memory of the DRAM-less SSD before the circuitry associated with the dirty cache lines becomes inoperable resulting in data loss in the DRAM cache. If the dirty cache lines are not flushed back to the DRAM-less SSD, the cached data may be permanently lost and the stale cache lines in the DRAM-less SSD flash are not updated. In one embodiment according to the present disclosure, instead of relying solely on a power good detect of the information handling system, a slope detect mechanism on the Vdd power rail of the DRAM-less SSD is utilized to detect the rate at which power is falling. If the rate exceeds a predetermined threshold or the slope detect mechanism indicates that the Vdd slope has reached a critical point indicating that a power failure may be imminent, a controller of the information handling system (such as an embedded controller (EC) or a microcontroller unit (MCU) issues a flush cache signal which drives a pin on the SSD controller which results in a flush of all dirty cache lines from the host memory buffer of the system random access memory (RAM).

In one embodiment, a method for implementing a power protection caching policy of an information handling system comprises querying a DRAM-less SSD for the supported cache modes of the SSD. When the SSD returns the one or more supported cache modes, it is determined if the SSD supports power protection caching policy. It is then determined if an indicator is indicative of a power failure whether an actual, imminent, false or possible power failure. If the indicator does indicate a power failure, then the power protection caching policy is applied where the power protection caching policy comprises issuing a flush cache signal by a controller of the information handling system to the SSD, issuing a command by the SSD to flush one or more dirty cache lines and flushing the one or more dirty cache lines. In another embodiment, the power protection caching policy may also comprise issuing a command by an SSD controller to a host SOC to cause a host memory buffer of a system random access memory (RAM) to flush the one or more dirty cache lines.

In one embodiment, the indicator that is indicative of a power failure is based, at least in part, on at least one of a power good detect mechanism and a slope detect mechanism. The indicator may be a result of a comparison by the power good detect mechanism of a voltage at a power rail of the SSD to a predetermined threshold. The indicator may also be a result of a comparison of a rate of change of voltage at a power rail indicated by a slope detect mechanism to a predetermined threshold. In one embodiment, the flush cache signal may be a signal to pin of an SSD controller or a command to the SSD controller.

In one or more embodiments modules that comprise instructions stored in a memory coupled to one or more processing units of the information handling system, the instructions when executed by the one or more processing units, are operable to perform operations comprising initializing a DRAM-less SSD of the information handling system, determining if the SSD supports a power protection caching policy, determining if a slope detect mechanism coupled to a controller of the information handling system is indicative of a power failure and applying the power protection caching policy. The power protection caching policy comprises determining a rate of power change via the slope detect mechanism, issuing a flush cache signal by the controller to the SSD, and flushing one or more dirty cache lines. The issuing of the flush cache signal, in one embodiment, may be based, at least in part, on a power good detect signal. In one embodiment, the slope detect mechanism detects power changes to the SSD via an i-sense. The slope detect mechanism in another embodiment may be indicative of a power failure of the SSD, a system RAM, or a host SOC.

In one or more embodiment one or more computer-readable non-transitory storage media embodying one or more instructions operable when executed in an information handling system to initialize a DRAM-less SSD of the information handling system, determine if the SSD supports a power protection caching policy, determine if a slope detect mechanism coupled to a controller of the information handling system is indicative of a power failure and apply the power protection caching policy. In one embodiment, the power protection caching policy comprises determining a rate of power change via the slope detect mechanism, issuing a flush cache signal by the controller to the SSD and flushing one or more dirty cache lines. The instructions may be further operable when executed to compare the rate of power change to a predetermined threshold. The power protection caching policy may also comprise issuing a command by an SSD controller to a host SOC to cause a host memory buffer of a system RAM to flush the one or more dirty cache lines. A pin of the SSD may be redefined to accept the flush cache signal. The flush cache signal may also be issued or asserted based, at least in part, on a power good detect signal. The slope detect mechanism may also detect power changes to the SSD via an i-sense.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources or processing units such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Particular embodiments are best understood by reference to FIGS. 1-5, wherein like numbers are used to indicate like and corresponding parts.

Figure 1:
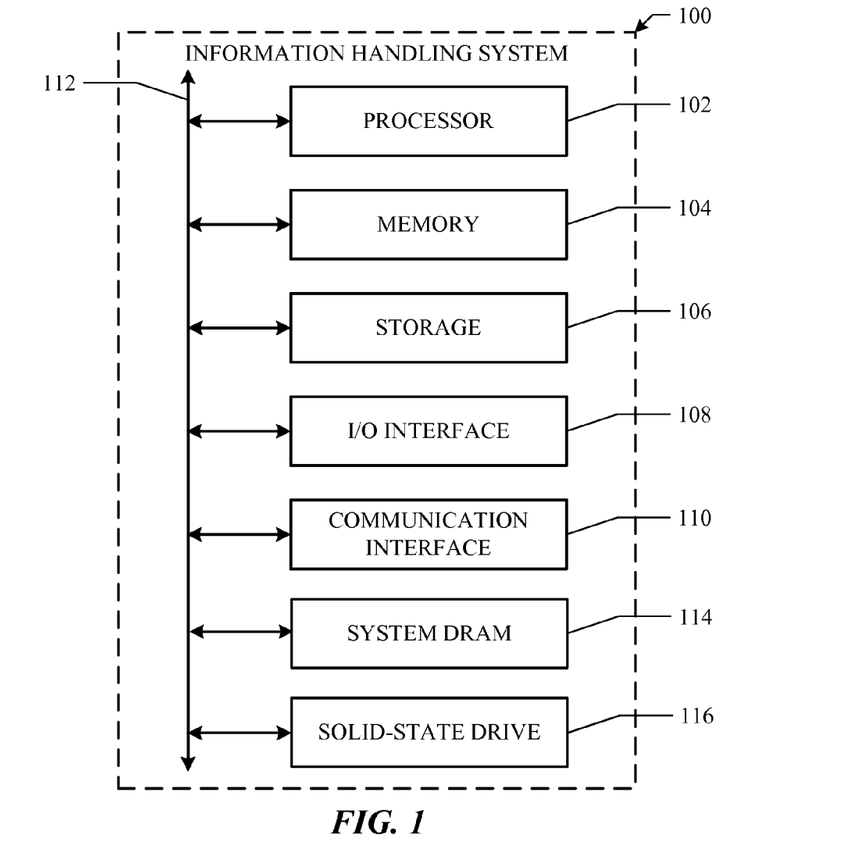
FIG. 1 is a block diagram of selected elements of an information handling system according to one embodiment of the present disclosure.

FIG. 1 illustrates an example information handling system 100. In particular embodiments, one or more information handling systems 100 perform one or more steps of one or more methods described or illustrated herein. In particular embodiments, one or more information handling systems 100 provide functionality described or illustrated herein. In particular embodiments, software running on one or more information handling systems 100 performs one or more steps of one or more methods described or illustrated herein or provides functionality described or illustrated herein. Particular embodiments include one or more portions of one or more information handling systems 100. Herein, reference to an information handling system may encompass a computing device, and vice versa, where appropriate. Moreover, reference to an information handling system may encompass one or more information handling systems, where appropriate.

This disclosure contemplates any suitable number of information handling systems 100. This disclosure contemplates information handling system 100 taking any suitable physical form. As an example and not by way of limitation, information handling system 100 may be an embedded information handling system, a system-on-chip (SOC), a single-board information handling system (SBC) (such as, for example, a computer-on-module (COM) or system-on-module (SOM)), a desktop information handling system, a laptop or notebook information handling system, an interactive kiosk, a mainframe, a mesh of information handling systems, a mobile telephone, a personal digital assistant (PDA), a server, a tablet information handling system, or a combination of two or more of these. Where appropriate, information handling system 100 may include one or more information handling systems 100; be unitary or distributed; span multiple locations; span multiple machines; span multiple data centers; or reside in a cloud, which may include one or more cloud components in one or more networks. Where appropriate, one or more information handling systems 100 may perform without substantial spatial or temporal limitation one or more steps of one or more methods described or illustrated herein. As an example and not by way of limitation, one or more information handling systems 100 may perform in real time or in batch mode one or more steps of one or more methods described or illustrated herein. One or more information handling systems 100 may perform at different times or at different locations one or more steps of one or more methods described or illustrated herein, where appropriate.

In particular embodiments, information handling system 100 includes a processor 102, memory 104, storage 106, an input/output (I/O) interface 108, a communication interface 110, a bus 112, a system dynamic random access memory (DRAM), and an SSD. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 102 includes hardware for executing instructions, such as those making up a computer program. As an example and not by way of limitation, to execute instructions, processor 102 may retrieve (or fetch) the instructions from an internal register, an internal cache, memory 104, or storage 106; decode and execute them; and then write one or more results to an internal register, an internal cache, memory 104, or storage 106. In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 106, and the instruction caches may speed up retrieval of those instructions by processor 102. Data in the data caches may be copies of data in memory 104 or storage 106 for instructions executing at processor 102 to operate on; the results of previous instructions executed at processor 102 for access by subsequent instructions executing at processor 102 or for writing to memory 104 or storage 106; or other suitable data. The data caches may speed up read or write operations by processor 102. The TLBs may speed up virtual-address translation for processor 102. In particular embodiments, processor 102 may include one or more internal registers for data, instructions, or addresses. This disclosure contemplates processor 102 including any suitable number of any suitable internal registers, where appropriate. Where appropriate, processor 102 may include one or more arithmetic logic units (ALUs); be a multi-core processor; or include one or more processors 102. Although this disclosure describes and illustrates a particular processor, this disclosure contemplates any suitable processor.

In particular embodiments, memory 104 includes main memory for storing instructions for processor 102 to execute or data for processor 102 to operate on. As an example and not by way of limitation, information handling system 100 may load instructions from storage 106 or another source (such as, for example, another information handling system 100) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 executes only instructions in one or more internal registers or internal caches or in memory 104 (as opposed to storage 106 or elsewhere) and operates only on data in one or more internal registers or internal caches or in memory 104 (as opposed to storage 106 or elsewhere). One or more memory buses (which may each include an address bus and a data bus) may couple processor 102 to memory 104. Bus 112 may include one or more memory buses, as described below. In particular embodiments, one or more memory management units (MMUs) reside between processor 102 and memory 104 and facilitate accesses to memory 104 requested by processor 102. In particular embodiments, memory 104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 104 may include one or more memories 104, where appropriate. Although this disclosure describes and illustrates particular memory, this disclosure contemplates any suitable memory.

In particular embodiments, storage 106 includes mass storage for data or instructions. As an example and not by way of limitation, storage 106 may include a hard disk drive (HDD), a floppy disk drive, flash memory, an optical disc, a magneto-optical disc, magnetic tape, or a USB drive or a combination of two or more of these. Storage 106 may include removable or non-removable (or fixed) media, where appropriate. Storage 106 may be internal or external to information handling system 100, where appropriate. In particular embodiments, storage 106 is non-volatile, solid-state memory. In particular embodiments, storage 106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 106 taking any suitable physical form. Storage 106 may include one or more storage control units facilitating communication between processor 102 and storage 106, where appropriate. Where appropriate, storage 106 may include one or more storages 106. Although this disclosure describes and illustrates particular storage, this disclosure contemplates any suitable storage.

In particular embodiments, I/O interface 108 includes hardware, software, or both, providing one or more interfaces for communication between information handling system 100 and one or more I/O devices. Information handling system 100 may include one or more of these I/O devices, where appropriate. One or more of these I/O devices may enable communication between a person and information handling system 100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 108 for them. Where appropriate, I/O interface 108 may include one or more device or software drivers enabling processor 102 to drive one or more of these I/O devices. I/O interface 108 may include one or more I/O interfaces 108, where appropriate. Although this disclosure describes and illustrates a particular I/O interface, this disclosure contemplates any suitable I/O interface.

In particular embodiments, communication interface 110 includes hardware, software, or both providing one or more interfaces for communication (such as, for example, packet-based communication) between information handling system 100 and one or more other information handling systems 100 or one or more networks. As an example and not by way of limitation, communication interface 110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 110 for it. As an example and not by way of limitation, information handling system 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Information handling system 100 may include any suitable communication interface 110 for any of these networks, where appropriate. Communication interface 110 may include one or more communication interfaces 110, where appropriate. Although this disclosure describes and illustrates a particular communication interface, this disclosure contemplates any suitable communication interface.

In particular embodiments, bus 112 includes hardware, software, or both coupling components of information handling system 100 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 112 may include one or more buses 112, where appropriate. Although this disclosure describes and illustrates a particular bus, this disclosure contemplates any suitable bus or interconnect.

In particular embodiments, system DRAM 114 is used to store data or instructions for information handling system 100. In one or more embodiments, system DRAM 114 may be an instance of memory 104. In one embodiment, system DRAM 114 is coupled to processor 102 directly. Typically, system DRAM 114 is in close proximity to processor 102 to enable fast access to the stored data. System DRAM 114 may be a separate component or part of another component of the information handling system. One or more interfaces known to one of ordinary skill in the art may be used to communicate with system DRAM 114. System DRAM 114 may be one or more types of DRAM. For example, system DRAM 114 may be asynchronous DRAM, fast page mode (FPM) DRAM, extended data out (EDO) DRAM, burst EDO (BEDO) DRAM, synchronous DRAM (SDRAM), single data rate (SDR) SDRAM, double data rate (DDR) SDRAM, DDR2 SDRAM, DDR3 SDRAM, DDR4 SDRAM, and any other type of DRAM known to one of ordinary skill in the art.

In particular embodiments, solid-state drive (SSD) 116 may be a DRAM-less SSD, or rather, an SSD that does not include internal or local DRAM as opposed to an SSD that includes DRAM as an internal cache. SSD 116 may have one or more cache lines coupled to the system DRAM. In one or more embodiments SSD 116 may be an instance of storage 106.

Figure 2:
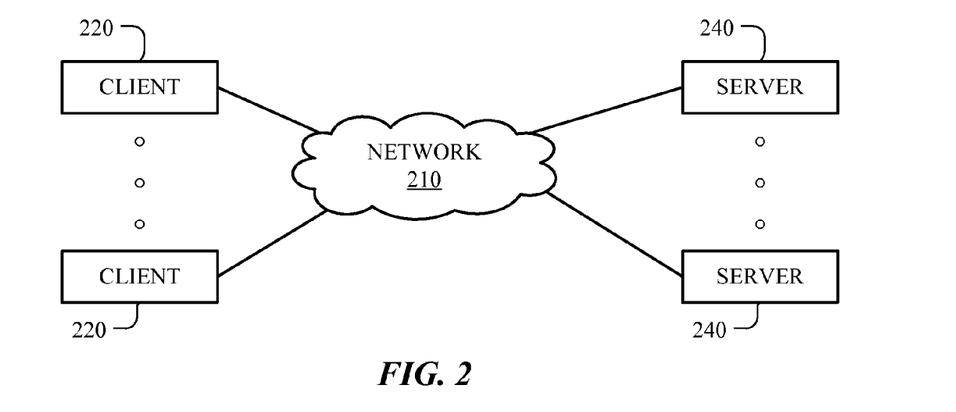
FIG. 2 is a block diagram of a client and server configuration according to one embodiment of the present disclosure.

FIG. 2 illustrates an example configuration of networked information handling systems (for example, client devices and servers). In particular embodiments, one or more client devices 220 and one or more servers 240 are connected via network 210. Network 210 may be a public network or a private (e.g. corporate) network. Additionally, network 210 may, for example, be a Local Area Network (LAN), a Wide Area Network (WAN), a wireless network, the Internet, an intranet or any other suitable type of network. In particular embodiments, network 210 may include one or more routers for routing data between client devices 220 and/or servers 240. A device (for example, a client device 220 or a server 240) on network 210 may be addressed by a corresponding network address including, for example, an Internet protocol (IP) address, an Internet name, a Windows Internet name service (WINS) name, a domain name or other system name. In particular embodiments, network 210 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client devices 220 may communicate with one or more servers 240 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Client device 220 may be a desktop computer, a laptop computer, a tablet computer, a handheld device, a mobile phone, a kiosk, a vending machine, a billboard, or any suitable information handling system. In particular embodiments, a client device 220 is an embedded computer and may have flash memory (e.g. a solid state drive) instead of a hard disk drive. In particular embodiments, a client device 220 is a thin client having limited processing capabilities and limited storage, and such a thin client may require minimal management and updates. A client device 220 may communicate with a server 240 via one or more protocols such as Hypertext Transfer Protocol (HTTP), Hypertext Transfer Protocol Secure (HTTPS), File Transfer Protocol (FTP), Common Internet File System (CIFS), Independent Computing Architecture (ICA) protocol (developed by Citrix Systems, Inc.), Remote Desktop Protocol (RDP) (developed by Microsoft Corporation), or any suitable protocol or combination of protocols.

A server 240 may include one or more of: a computing device, a desktop computer, a laptop computer, a database, a corporate server, a repository server, a configuration application server, a domain name system (DNS) server, a dynamic host configuration protocol (DHCP) server, a virtual machine (e.g., VMware® Virtual Machine), a desktop session (e.g., Microsoft Terminal Server), a published application (e.g., Microsoft Terminal Server), or any suitable information handling system. As an example, a private (for example, corporate) network may include a device manager server and a repository server each configured to communicate with multiple client devices 220 across one or more domains, sites, or subnets of network 210. In particular embodiments, a server 240 may include one or more servers, or functions of one or more servers. A client device 220 may access software resources provided by a server 240 such as, for example, operating systems, add-ons, content, or any other suitable data, applications, or images. In particular embodiments, a client 220 may access resources provided by a server 240 only after providing suitable authentication information. Alternatively, a server 240 may provide software or other resources automatically to one or more client devices 220.

Figure 3:
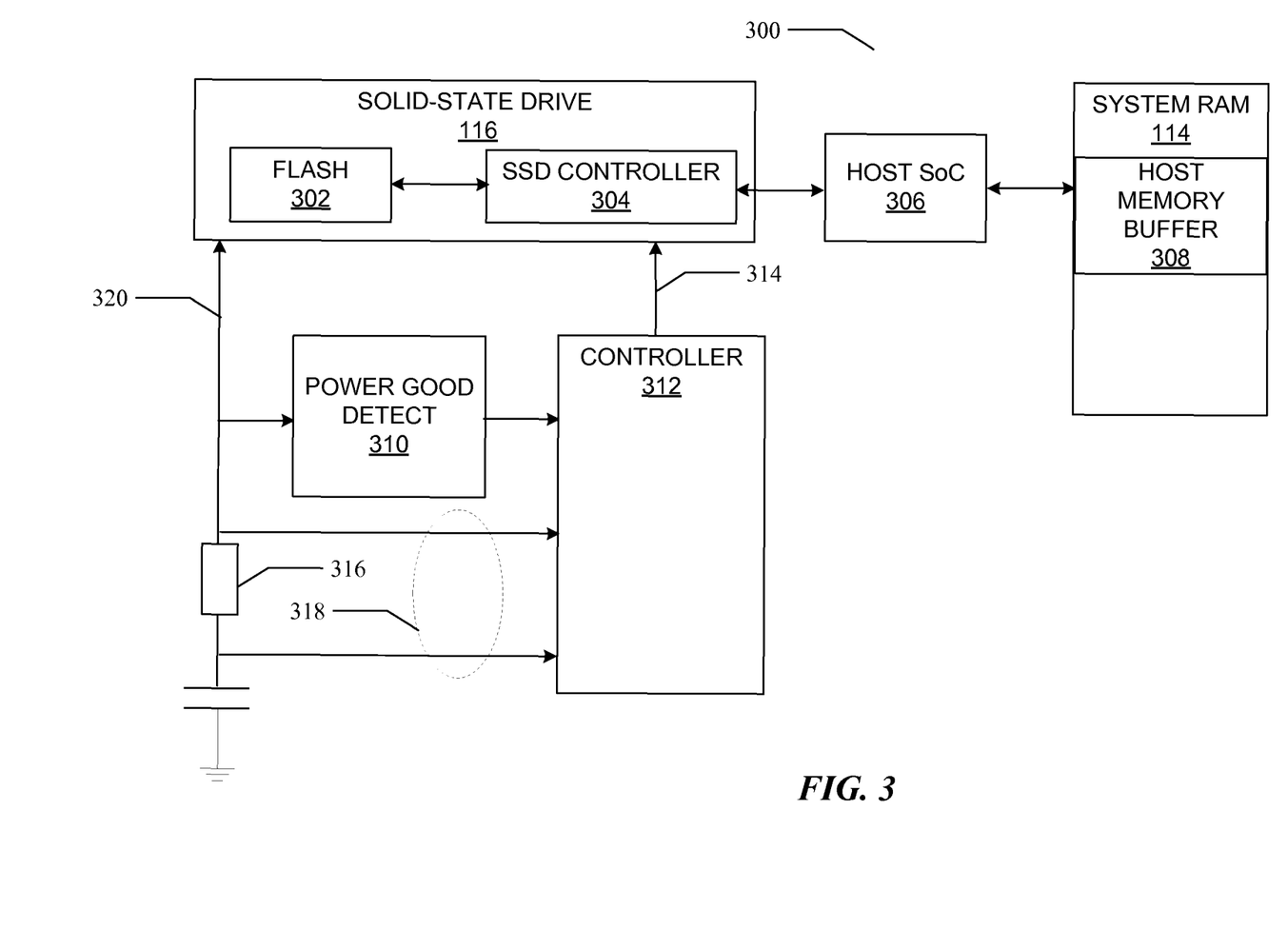
FIG. 3 is a block diagram of selected components of an information handling system for providing data protection during a power failure event for an SSD that does not include DRAM according to one embodiment of the present disclosure.

FIG. 3 illustrates an example configuration 300 of an SSD 116 in an information handling system 100. SSD 116 may include a flash 302 and an SSD controller 304. In a DRAM-less SSD, such as SSD 116, instead of having DRAM storage as cache local to the SSD 116, the cache is an allocated segment of system RAM 114 and referred to throughout as host memory buffer 308. In other embodiments, the cache for the SSD 116 may an allocated segment of any other appropriate memory known to one of ordinary skill in the art. The flash 302 is a non-volatile memory portion of the SSD 116. The SSD controller 304 interfaces to the flash 302 and performs one or more operations to read data from and/or write data to the flash 302 and may transmit any data to the host SOC 306. In one embodiment, such an SSD 116 that does not include local DRAM may support a power protection caching policy (or simply power protection caching) such that during a power failure or according to one or more criteria indicative of a power failure, dirty cache lines are flushed back to the SSD 116 to prevent data loss.

SSD 116 is coupled to a host system on chip (SOC) 306 via SSD controller 304. The Host SoC may be any appropriate component known to one of ordinary skill in the art including a system central processing unit (CPU) or south bridge or any other controller known to one of ordinary skill in the art that accesses SSD 116. In one embodiment SSD controller 304 communicates with host SoC 306 via a PCIe bus. Host SoC 306 is coupled to system RAM 114. System RAM 114 may include a host memory buffer 308. SSD 116 may also be coupled to a controller 312 via flush cache signal 314. In one or more embodiments, the controller 312 may be an embedded controller (EC), a micro-controller unit (MCU), or any other controller known to one of ordinary skill in the art for performing various system level functions. For example, controller 312 facilitates the function of determining when power is decreasing beyond a threshold rate or has reached a threshold voltage where the host memory buffer 308 needs to be flushed so as not to lose any data.

In one embodiment, a pin, for example pin 11, of SSD 116 is redefined to serve as a hardware flush cache pin and is driven by flush cache signal 314. For example, in one embodiment the SSD 116 is designed with a pin 11 that has been redefined to be an input for the flush cache signal 314. The assertion of the flush cache signal 314 forces the SSD controller 304 to flush all dirty cache lines from the host memory buffer 308. As known to one of ordinary skill in the art, any unused pin of SSD 116 may be redefined to receive the flush cache signal 314. In one embodiment, flush cache signal 314 may be set to 'ON' or raised high (equal to a binary '1' or an equivalent voltage level, for example, approximately 5 volts) or set to 'OFF' or pulled low to indicate that the SSD 116 should communicate with the host SoC 306 to flush the dirty cache lines from the host memory buffer 308. In another embodiment, flush cache signal 314 may be a command issued from the controller 312 to SSD controller 304 that causes the SSD controller 304 to request that all dirty cache lines be flushed. Throughout this disclosure, reference to flush cache signal 314 should be understood to mean a reference to a signal to a pin of SSD controller 304, a command that serves the same or similar function, or any combination thereof.

Controller 312 may be a microcontroller unit (MCU), an embedded controller (EC), or any other controller known to one of ordinary skill in the art. The controller 312 handles system tasks that the operating system (OS) does not handle, for example, receiving signals from a power good detect mechanism 310 or a slope detect mechanism 318. Power good detect mechanism 310 receives a signal indicative of the voltage (for example, the voltage at the drain supply commonly represented as Vdd) at power rail 320 that serves the SSD. Power good detect mechanism 310 is any such mechanism known in the art that detects when power is above a certain threshold (power good indication) or drops below a certain threshold (power fail indication). The power good detect mechanism 310 may be a system function as known in the art. The power good detect mechanism 310 informs the controller 312 of the power supply states so that the controller 312 can take appropriate actions. In one embodiment, the controller 312 may assert a reset signal in response to the power good detect mechanism. In one embodiment the power good detect mechanism 310 may cause the controller 312 to assert the cache flush signal 314 to the SSD controller 304.

In one embodiment, controller 312 interfaces with a slope detect mechanism 318 on the power rail 320. The i-sense 316 is a current sense which produces a voltage proportional to the current through the SSD 116. The current through the SSD 116 is proportional to the slope of the rate of change of the power rail 320. By detecting the current through SSD 316, the controller 312 has a measure of the rate of change of the Vdd voltage at the power rail 320. When the controller 312 detects via slope detect mechanism 318 a current through i-sense 316 that exceeds a threshold, which indicates the power rail 320 is changing at a rate greater than the threshold, the controller 312 determines that a power failure to the SSD 116 may occur and will proactively assert the flush cache signal 314. The slope detect mechanism 318 detects the rate at which power to the SSD 116 is falling.

While only a power rail 320 (for example, Vdd) for SSD 116 is shown, the present disclosure contemplates any number of power rails for SSD 116 and also contemplates any number of similar power rails for the host SoC 306, the system RAM 114, and any other component that may include such a power rail known to one of ordinary skill in the art. Any such component may couple to the SSD 116 via a flush cache signal 314. For example, in one embodiment one or more of host SoC 306, system RAM 114 and controller 312 include a flush cache signal 314 respectively, where each flush cache signal 314 couples to the SSD 116.

Any logic known to one of ordinary skill in the art may be implemented to couple each flush cache signal 314, for example, an OR gate.

Figure 4:
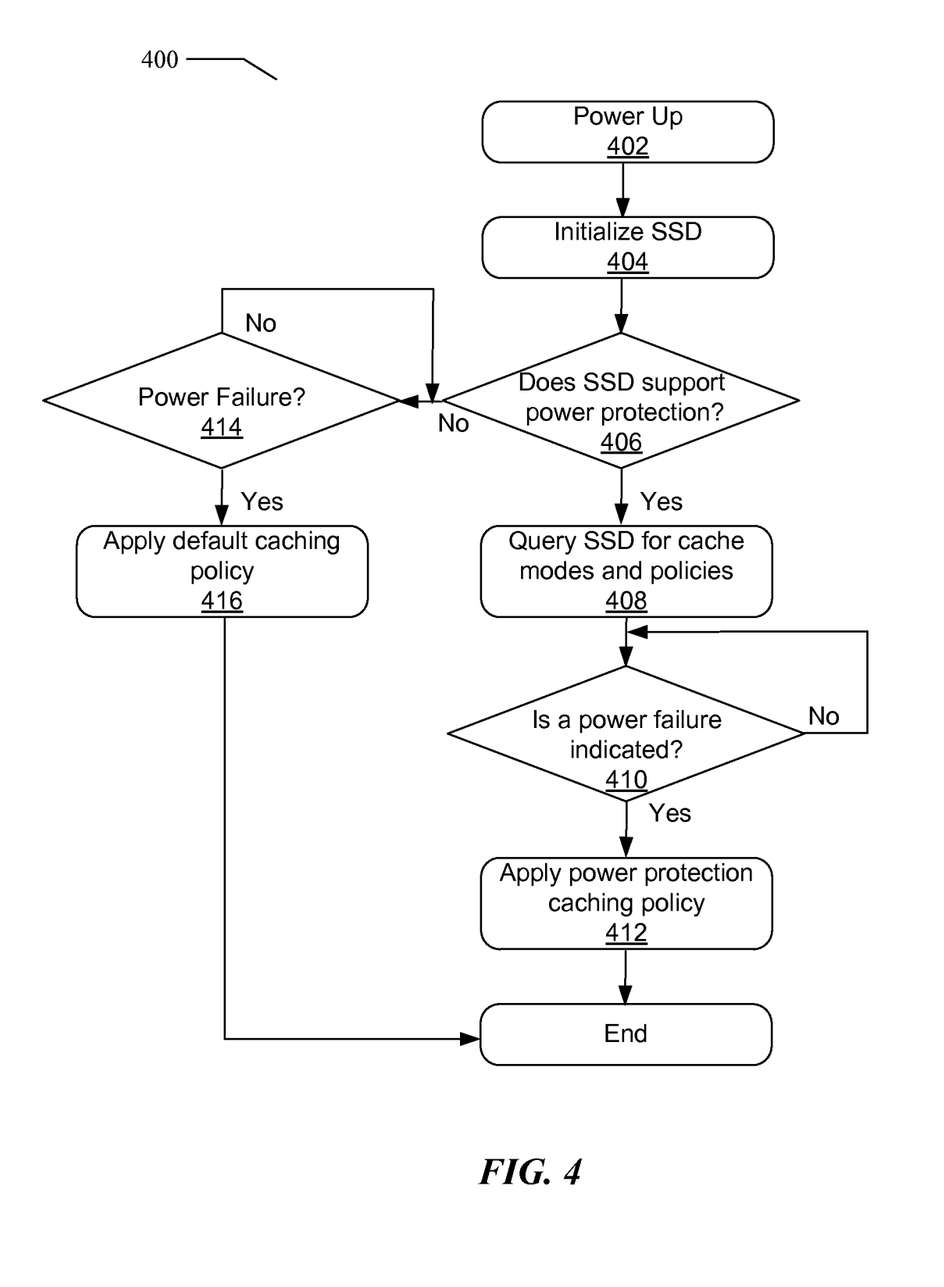
FIG. 4 is a flowchart of an example method according to one embodiment of the present disclosure.

FIG. 4 illustrates a flow chart of an example method in accordance with certain embodiments of the present disclosure. At step 402, the information handling system 100 is powered up. In one or more embodiments, the method may begin at any time after a power-up sequence has been initiated. At step 404, the SSD 116 is initialized, for example, by firmware, such that the SSD 116 is operational when the basic input output system (BIOS) points to the boot record of the information handling system 100.

At step 406, it is determined if the SSD 116 supports a power protection caching policy or power protection caching according to one or more embodiments of the present invention. For example, it is determined if SSD 116 is operable to receive a flush cache signal 314 indicative of a potential power failure as detected by controller 312 via a slope detect mechanism 318 or a power good detect mechanism 310 or any combination thereof. In one embodiment, one of the fields of the configuration capabilities fields of the SSD 116 indicates such power protection caching is supported. For example, as known to one of ordinary skill in the art all PCIe connected devices support configuration capabilities fields. A flag associated with one of these fields may be set or cleared to indicate support for a power protection caching policy. In other embodiments, a BIOS interface, a command-line interface, a graphical user interface (GUI), or any other interface known to one of ordinary skill in the art may be used to set (or clear) a flag, semaphore, variable, setting, or other indicator that a device, such as SSD 116, supports such a power protection caching policy. In one embodiment, at each power-up or boot sequence the PCI configuration space, a registry setting, or any other storage location known to one of ordinary skill in the art for storing such information is read to determine at step 406 whether a device supports power protection caching. In another embodiment, it is determined at any time during operation of the information handling system 100 at step 406 whether a device supports power protection caching. For example, a device, such as SSD 116, may be configured initially to support the power protection caching policy but may be later configured during operation to not support the power protection caching policy and likewise, a configuration may initially indicate no support for the power protection caching policy but the configuration may be later changed during operation to indicate that the power protection caching policy is supported. In either example, it may be determined by a system administrator or other user that the power protection caching policy indicator needs to be altered to indicate support for the power protection caching policy or no support for the power protection caching policy. Such an alteration should not interrupt the otherwise normal operation of the information handling system, such as normal operation of device SSD 116.

If the SSD 116 does not the support power protection caching policy, then at step 414 it is determined if there is a power failure. In one embodiment, if no power failure is detected, the method may continue to poll for a power failure at step 414. In another embodiment, the method may end, wait for a semaphore or other time interval to elapse before checking for a power failure. If a configuration of the SSD 116 is changed such that the configuration indicates that the SSD 116 does support the power protection caching policy, the method may proceed to step 406 or step 408. If a power failure is detected at step 414, then at step 416 the default caching policy for the SSD 116 is applied. In one embodiment, the method may continuously poll, check for a semaphore, check based on a predetermined time interval or use any other method known to one of ordinary skill in the art to determine if a power failure is occurring according to one or more techniques known to one of ordinary skill in the art.

If at step 406 it is determined, for example by processor 102, that the SSD 116 supports power protection caching, then at step 408 the controller 312 queries the SSD 116 for cache modes and policies supported by the SSD 116. The SSD 116 returns its supported cache modes and any associated polices to ensure that the power protection caching policy coexists with the required cache policies of the SSD 116. For example, SSD 116 may return the cache line sizes that the SSD 116 may write to system DRAM 114, how much system DRAM 114 the SSD 116 may use, and where any used memory of system DRAM 114 will be allocated, for example, allocation of host memory buffer 308.

At step 410, it is determined if a power failure is indicated. If no power failure is indicated then the process continues to monitor for a power failure. In certain embodiments, the slope detect mechanism 318, the power good detect mechanism 310, or any combination thereof may be used to indicate a power failure. In one embodiment, controller 312 continuously polls or monitors the slope detect mechanism 318, power good detect mechanism 310, or any combination thereof. In one embodiment, both the slope detect mechanism 318 and the power good detect mechanism 310 are monitored such that if either indicates a power failure, the method proceeds to step 412. A power failure may be, for example, an imminent or potential critical power fault, a complete power loss, a power interruption that may cause loss of data, a power level that falls below an acceptable level for proper operation of the SSD 116, a rate of change that indicates power will fall below an acceptable level for proper operation of the SSD 116, a false power failure, a power level indicative of any of the aforementioned, or any other power indicator known to one of ordinary skill in the art. A power failure may be indicated where no failure actually occurs, for example, a false power failure is indicated. In one embodiment, such false power failures are recorded in a log, memory, database or any other location known to one of ordinary skill in the art for review by a user, such as a system administrator, or other system, program, interface, etc. for analysis so as to determine whether an alteration of a threshold or other setting should be made to make the power protection caching policy operate more efficiently. However, even if the power protection caching policy is effectuated for a false power failure indicator, the overall performance of the information handling system 100 should not be affected given that flushing any dirty cache lines prevents data loss without impacting the operation of the SSD 116.

In one embodiment, both the slope detect mechanism 318 and the power good detect mechanism 310 are monitored and if either or both of them indicates a potential power failure the flush cache signal 314 is asserted by the controller 312 as described in step 412. In one embodiment whether a power failure is indicated may be determined based, at least in part, on a comparison of voltage determined by the slope detect mechanism 318 to a predetermined threshold. Likewise, in another embodiment the power good detect mechanism 310 compares the voltage at the power rail 320 (Vdd) to a predetermined threshold. The predetermined thresholds for either mechanism may be set via a GUI, a command line interface, by the manufacturer of the controller 312, determined based on i-sense 316, or any other method known to one of ordinary skill in the art. The predetermined thresholds may be set prior to distribution of the information handling system 100, dynamically during operation, during the boot sequence, or at any other time known to one of ordinary skill in the art. The predetermined thresholds may be stored in memory associated with the controller 312. For example, the predetermined thresholds may be stored by the BIOS firmware of the controller 312. In one or more embodiments, the predetermined thresholds may be indicative of range of values.

If it is determined that a power failure (whether false, actual, potential, etc.) is indicated, then at step 412, the power protection caching policy is applied. In one embodiment, the controller 312 issues a flush cache signal 314 to SSD 116 which drives a pin of SSD controller 304, for example, pin 11 of SSD 116. In another embodiment, the controller 312 issues a command to the SSD controller 304. Upon receiving the flush cache signal 314 or command, the SSD controller 304 issues a command to host SoC 306 to flush all dirty cache lines from the host memory buffer 308 back to the flash 302 of SSD 116.

Figure 5:
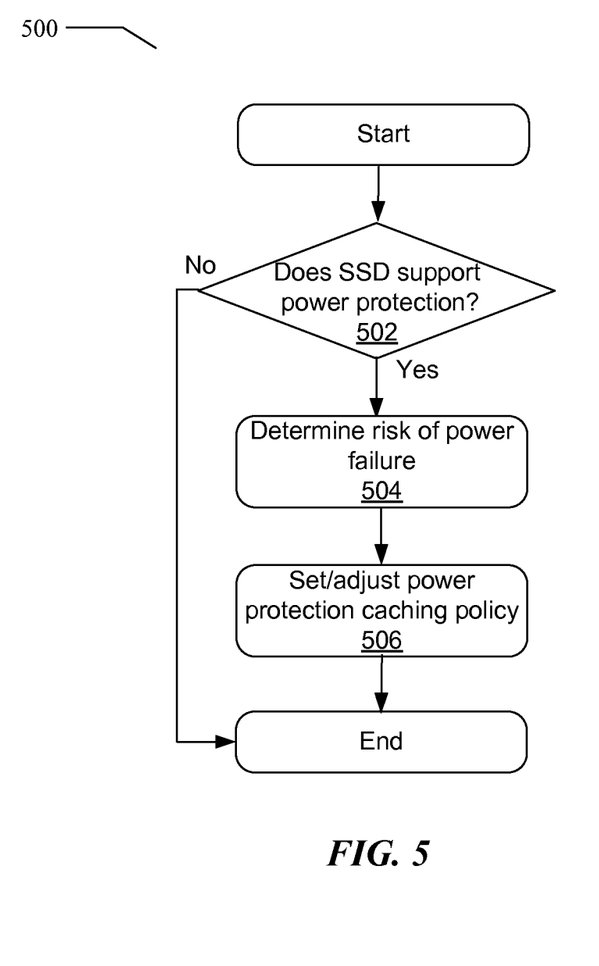
FIG. 5 is a flowchart of an example method according to one embodiment of the present disclosure.

FIG. 5 illustrates a flow chart of an example method in accordance with certain embodiments of the present disclosure. The power protection caching policy may be setup at any time and may, in certain embodiments, be adjusted in real-time or throughout the operation of the information handling system 100, the client 220, server 240 or any other computing system of the network 210 that includes such a policy.

At step 502, it is determined if the SSD 116 supports a power protection caching policy or power protection caching according to one or more embodiments of the present invention as discussed with respect to FIG. 4. If no power protection caching policy exists, the method ends. If the SSD 116 does support a power protection caching policy, then at step 504 the risk of power failure for the SSD 116 (or the information handling system 100) is determined. The risk of power failure may be determined in any number of ways known to one of ordinary skill in the art. In one embodiment, the risk of power failure is determined by evaluating the external power source and the battery charge level. For example, when either an external power source is present or if a battery is present and the charge level of the battery is high whether or not an external power source is present, then the risk of power failure is determined to be low. In another example, if no external power source is detected and the battery charge level is low, then the risk of power failure is determined to be high. The "low" and "high" battery charge levels may be a predetermined threshold that may be stored in a BIOS setting or any other memory location known to one of ordinary skill in the art. The determination at step 504 may then be based, at least in part, on a comparison of the determined charge level of the battery to the predetermined threshold.

In one embodiment, when the charge level of the battery is at 50% or lower, the risk of power failure may be determined to be high and any charge level greater than 50%, the risk of power failure may be determined to be low. The predetermined threshold may be based on the type of SSD 116, the type of information handling system 100, the sensitivity of the data (whether highly sensitive such that any loss of data is not tolerated or not sensitive such that tolerable data loss levels are acceptable), user preferences, administrator preferences, or any other criteria known to one of ordinary skill in the art. In one or more embodiments, a range of values may be utilized such that the charge level of the battery is determined to be within or outside a range.

At step 506, the power protection caching policy is set or adjusted based, at least in part, on the determined risk of power failure from step 504. If the risk of power failure was determined to be low, then the power protection caching policy may include one or more parameters or attributes that are indicative of a more aggressive power protection caching. For example, the one or more aggressive parameters may indicate any one or more of increase host cache residency, expand allocated host memory buffer 308 size, flush any data cache lines as needed, allow all scheduled background tasks, and perform operations in full performance mode. If the risk of power failure was determined to be high, then the power protection caching policy may include one or more parameters or attributes that are indicative of a more safe power protecting caching. For example, the one or more safe parameters may include any one or more of reduce host cache residency, minimize allocated host memory buffer 308 size, increase rate of flushing cached data, suspend all scheduled background tasks for as long as possible, and limit the number of critical background tasks. Any one or more of the steps of 500 may be implemented any time a power-related event occurs and may be implemented in real-time. For example, a power-related event may include any one or more of a new or different external power source is detected, a battery is removed, added, or changed, one or more components are changed, added or removed, or any other power-related events known to one of ordinary skill in the art.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The concepts disclosed in this application should not be understood to be limited to the exemplary embodiments described herein, but should be understood to encompass all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for implementing a power protection caching policy of an information handling system comprising:
   querying a solid-state drive (SSD) of the information handling system, wherein the SSD does not include dynamic random access memory (DRAM) local to the SSD;
   returning, by the SSD, one or more supported caching modes of the SSD;
   determining if the SSD supports the power protection caching policy based, at least in part, on the one or more supported caching modes;
   determining a risk of power failure, wherein the risk of power failure is based, at least in part, on one or more risk parameters;
   setting one or more attributes of the power protection caching policy based, at least in part on, the determined risk of power failure;
   determining if an indicator is indicative of a power failure; and
   applying the power protection caching policy, wherein the power protection caching policy comprises:
      issuing a flush cache signal by a controller of the information handling system to the SSD;
      issuing a command by the SSD to flush one or more dirty cache lines; and
      flushing the one or more dirty cache lines.

2. The method of implementing a power protection caching policy of claim 1, wherein the indicator is based, at least in part, on at least one of a power good detect mechanism and a slope detect mechanism.

3. The method of implementing a power protection caching policy of claim 1, wherein the power protection caching policy further comprises:
   issuing a command by an SSD controller to a host system on chip to cause a host memory buffer of a system random access memory (RAM) to flush the one or more dirty cache lines.

4. The method of implementing a power protection caching policy of claim 1, wherein the flush cache signal is at least one of a signal to a pin of an SSD controller and a command to the SSD.

5. The method of implementing a power protection caching policy of claim 1, wherein the indicator is a result of a comparison by a power good detect mechanism of a voltage at a power rail of the SSD to a predetermined threshold.

6. The method of implementing a power protection caching policy of claim 1, wherein indicator is a result a comparison of a rate of change of voltage at a power rail indicated by a slope detect mechanism to a predetermined threshold.

7. The method of implementing a power protection caching policy of claim 1, wherein indicative of the power failure comprises an actual power failure, a false power failure, and a potential power failure.

8. A system comprising:
   an information handling system;
   one or more central processing units of the information handling system for processing information of the information handling system;
   a memory of the information handling system communicatively coupled to the one or more central processing units; and
   one or more modules that comprise instructions stored in the memory, the instructions, when executed by the one or more processing units, operable to perform operations comprising:
      initializing an SSD of the information handling system, wherein the SSD does not include dynamic random access memory (DRAM) local to the SSD;
      determining if the SSD supports a power protection caching policy;
      determining a risk of power failure, wherein the risk of power failure is based, at least in part, on one or more risk parameters;
      setting one or more attributes of the power protection caching policy based, at least in part on, the determined risk of power failure;
      determining if an indicator is indicative of a power failure; and
      applying the power protection caching policy, wherein the power protection caching policy comprises:
         determining a rate of power change;
         issuing a flush cache signal by the controller to the SSD; and
         flushing one or more dirty cache lines.

9. The system of claim 8, wherein the power protection caching policy further comprises:
   comparing the rate of power change to a predetermined threshold.

10. The system of claim 8, wherein the power protection caching policy further comprises:
    issuing a command by an SSD controller to a host system on chip to cause a host memory buffer of a system random access memory (RAM) to flush the one or more dirty cache lines.

11. The system of claim 8, wherein the instructions further operable to perform operations comprising:
    redefining a pin of the SSD to accept a flush cache signal.

12. The system of claim 8, wherein issuing the flush cache signal is based, at least in part, on one or more of a power good detect signal and a slope detect mechanism.

13. The system of claim 8, wherein a slope detect mechanism detects power changes to the SSD via an i-sense.

14. The system of claim 8, wherein at least one of a power-good detect signal and slope detect mechanism is indicative of a power failure of the SSD, a system random access memory (RAM), or a host system on chip.

15. One or more computer-readable non-transitory storage media embodying one or more instructions operable when executed in an information handling system to:
    initialize an SSD of the information handling system, wherein the SSD does not include dynamic random access memory (DRAM) local to the SSD;
    determine if the SSD supports a power protection caching policy;
    determining a risk of power failure, wherein the risk of power failure is based, at least in part, on one or more risk parameters;
    setting one or more attributes of the power protection caching policy based, at least in part on, the determined risk of power failure;
    determine if an indicator is indicative of a power failure; and
    apply the power protection caching policy, wherein the protection policy is applied based, at least in part on the one or more attributes, and wherein the power protection caching policy comprises:
determining a rate of power change;
issuing a flush cache signal by the controller to the SSD; and
flushing one or more dirty cache lines.

16. The information handling system of claim 15, wherein the one or more instructions are further operable when executed to:
compare the rate of power change to a predetermined threshold.

17. The information handling system of claim 15, wherein the power protection caching policy further comprises:
issuing a command by an SSD controller to a host system on chip to cause a host memory buffer of a system random access memory (RAM) to flush the one or more dirty cache lines.

18. The information handling system of claim 15, wherein the one or more instructions are further operable when executed to:
redefine a pin of the SSD to accept the flush cache signal.

19. The information handling system of 15, wherein the flush cache signal is issued based, at least in part, on at least one or more of a power good detect signal and a slope detect mechanism.

20. The information handling system of claim 15, wherein a slope detect mechanism detects power changes to the SSD via an i-sense.

* * * * *